US011694413B2

(12) United States Patent
Ng et al.

(10) Patent No.: US 11,694,413 B2
(45) Date of Patent: Jul. 4, 2023

(54) IMAGE EDITING AND SHARING IN AN AUGMENTED REALITY SYSTEM

(71) Applicant: Spatial Systems Inc., New York, NY (US)

(72) Inventors: Peter Ng, San Francisco, CA (US); Jinha Lee, New York, NY (US); Anand Agarawala, New York, NY (US)

(73) Assignee: SPATIAL SYSTEMS INC., New York, NY (US)

( * ) Notice: Subject to any disclaimer, the term of this patent is extended or adjusted under 35 U.S.C. 154(b) by 0 days.

(21) Appl. No.: 17/002,318

(22) Filed: Aug. 25, 2020

(65) Prior Publication Data
US 2022/0068036 A1    Mar. 3, 2022

(51) Int. Cl.
*G06T 19/20*    (2011.01)
*G06T 19/00*    (2011.01)
(Continued)

(52) U.S. Cl.
CPC ............ *G06T 19/20* (2013.01); *G06F 3/1454* (2013.01); *G06T 19/006* (2013.01);
(Continued)

(58) Field of Classification Search
CPC ..... G06T 19/006; G06T 19/20; G06F 16/176; G06F 16/1767; G06F 16/1774; G06F 3/1454; H04L 65/1086; H04L 65/4015; H04L 65/403; H04L 65/4038; H04L 65/4046; H04L 65/4053
See application file for complete search history.

(56) References Cited

U.S. PATENT DOCUMENTS 5,675,755 A    10/1997    Trueblood
11,410,393 B2    8/2022    Ng et al.
(Continued)

FOREIGN PATENT DOCUMENTS

WO    WO 2017215899 A2    12/2017

OTHER PUBLICATIONS

"eHowTech, ""How to Select Paper Size in Paint: Digital Art & MS Paint"", published in YouTube as of Jul. 22, 2014, at URL: https://www.youtube.com/watch?v=x5BphTESN_I, and archived as of at least Feb. 23, 2019 at archive.org) (Year: 2014)".
(Continued)

*Primary Examiner* — Diane M Wills
(74) *Attorney, Agent, or Firm* — Sterne, Kessler, Goldstein & Fox P.L.L.C.

(57) ABSTRACT

Disclosed herein are various embodiments for image editing and sharing in an augmented reality computing environment. An embodiment operates by receiving, from a first user, an edit command indicating a selection of an image from within an augmented reality computing environment. Responsive to the edit command, the image is moved from a first location within the augmented reality computing environment to a second location within the augmented reality computing environment closer to the first user than the first location. One or more edits to the image are received from the first user. The image including the one more edits are returned to the first location upon a completion of the one or more edits.

19 Claims, 12 Drawing Sheets

(51) Int. Cl.
*G06F 16/176* (2019.01)
*H04L 65/401* (2022.01)
*H04L 65/4053* (2022.01)
*G06F 3/14* (2006.01)

(52) U.S. Cl.
CPC ...... *H04L 65/4015* (2013.01); *H04L 65/4053* (2013.01); *G06F 16/176* (2019.01)

(56) References Cited

U.S. PATENT DOCUMENTS

| | | |
|---|---|---|
| 2008/0165390 A1 | 7/2008 | Kim |
| 2012/0249741 A1* | 10/2012 | Maciocci .............. G06T 19/006 348/51 |
| 2012/0297342 A1 | 11/2012 | Jang et al. |
| 2013/0067396 A1 | 3/2013 | Demopoulos et al. |
| 2013/0305187 A1 | 11/2013 | Phillips et al. |
| 2014/0320697 A1 | 10/2014 | Lammers et al. |
| 2018/0314484 A1* | 11/2018 | Pahud ................. A63F 13/5255 |
| 2019/0019022 A1 | 1/2019 | Marda et al. |
| 2019/0019348 A1* | 1/2019 | Yamamoto .............. G06F 3/017 |
| 2019/0068682 A1* | 2/2019 | He ........................ H04L 65/403 |
| 2019/0079704 A1 | 3/2019 | Tokuchi |
| 2019/0251884 A1* | 8/2019 | Burns ...................... G09G 5/14 |
| 2019/0362557 A1* | 11/2019 | Lacey ....................... G06T 5/20 |
| 2020/0082562 A1 | 3/2020 | Dagley et al. |
| 2020/0241647 A1* | 7/2020 | Kanda ................... G06F 3/0481 |
| 2020/0242844 A1* | 7/2020 | Bae ......................... G06F 3/011 |
| 2020/0257436 A1 | 8/2020 | Yun et al. |
| 2022/0068025 A1 | 3/2022 | Ng et al. |

OTHER PUBLICATIONS

International Search Report and Written Opinion directed to related International Application No. PCT/US2021/047293, dated Jan. 6, 2022; 11 pages.

\* cited by examiner

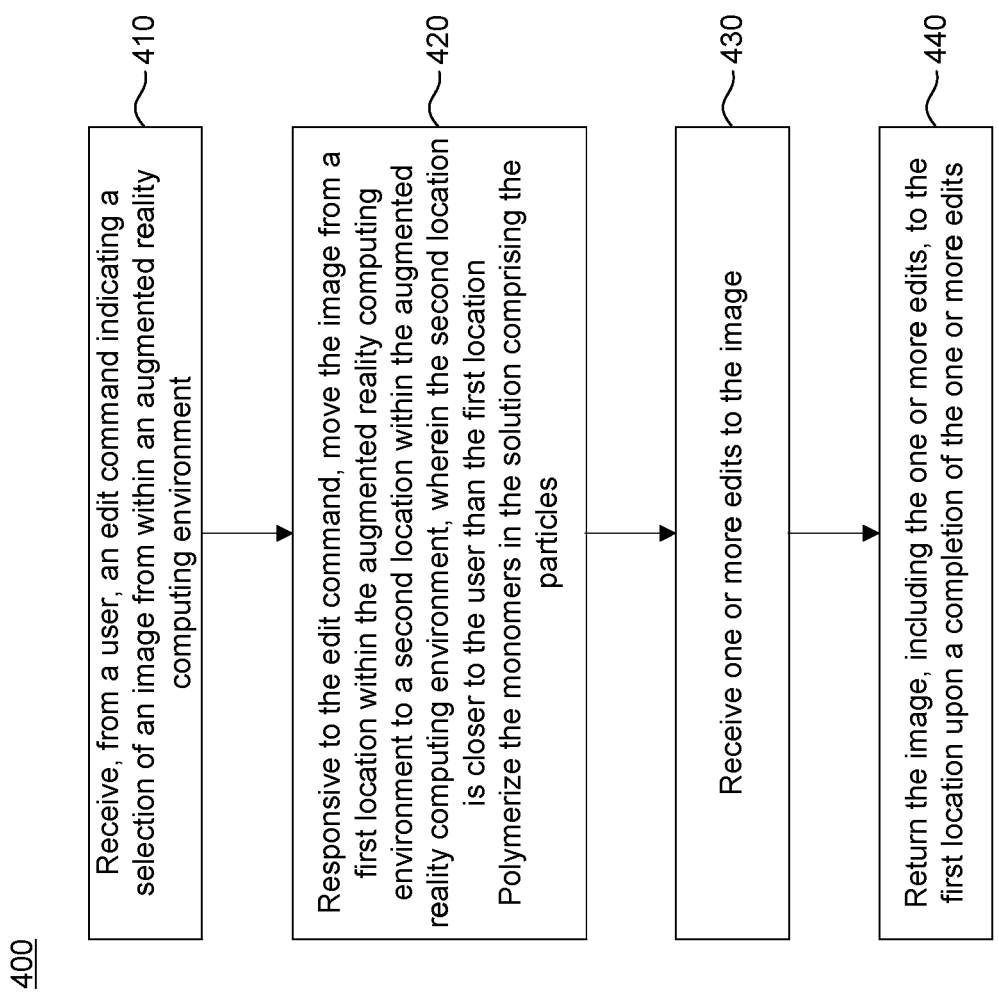

IMAGE EDITING AND SHARING IN AN AUGMENTED REALITY SYSTEM

CROSS-REFERENCE TO RELATED APPLICATION

This application is related to U.S. patent application Ser. No. 17/002,366, titled "Auto Arranging Wall in an Augmented Reality System" to Ng et al., filed herewith, which is herein incorporated by reference in its entirety.

BACKGROUND

There are any number of different programs that allow users to draw or edit images within a computing system. However, if a user wants to share the edits the user has made to a file or image, the user has to open the program, open the file, edit the image, and save and sometimes even close the image before another user can see what edits were made to the image.

BRIEF DESCRIPTION OF THE DRAWINGS

The accompanying drawings are incorporated herein and form a part of the specification.

FIG. 4 is a flowchart illustrating example operations for providing functionality related to image editing and sharing in an AR computing environment, according to some embodiments.

In the drawings, like reference numbers generally indicate identical or similar elements. Additionally, generally, the left-most digit(s) of a reference number identifies the drawing in which the reference number first appears.

DETAILED DESCRIPTION

There are any number of different programs that allow users to draw or edit images within a computing system. However, if a user wants to share the edits the user has made to a file or image, the user has to open the program, open the file, edit the image, and save and sometimes even close the image before another user can see what edits were made to the image.

Figure 1:
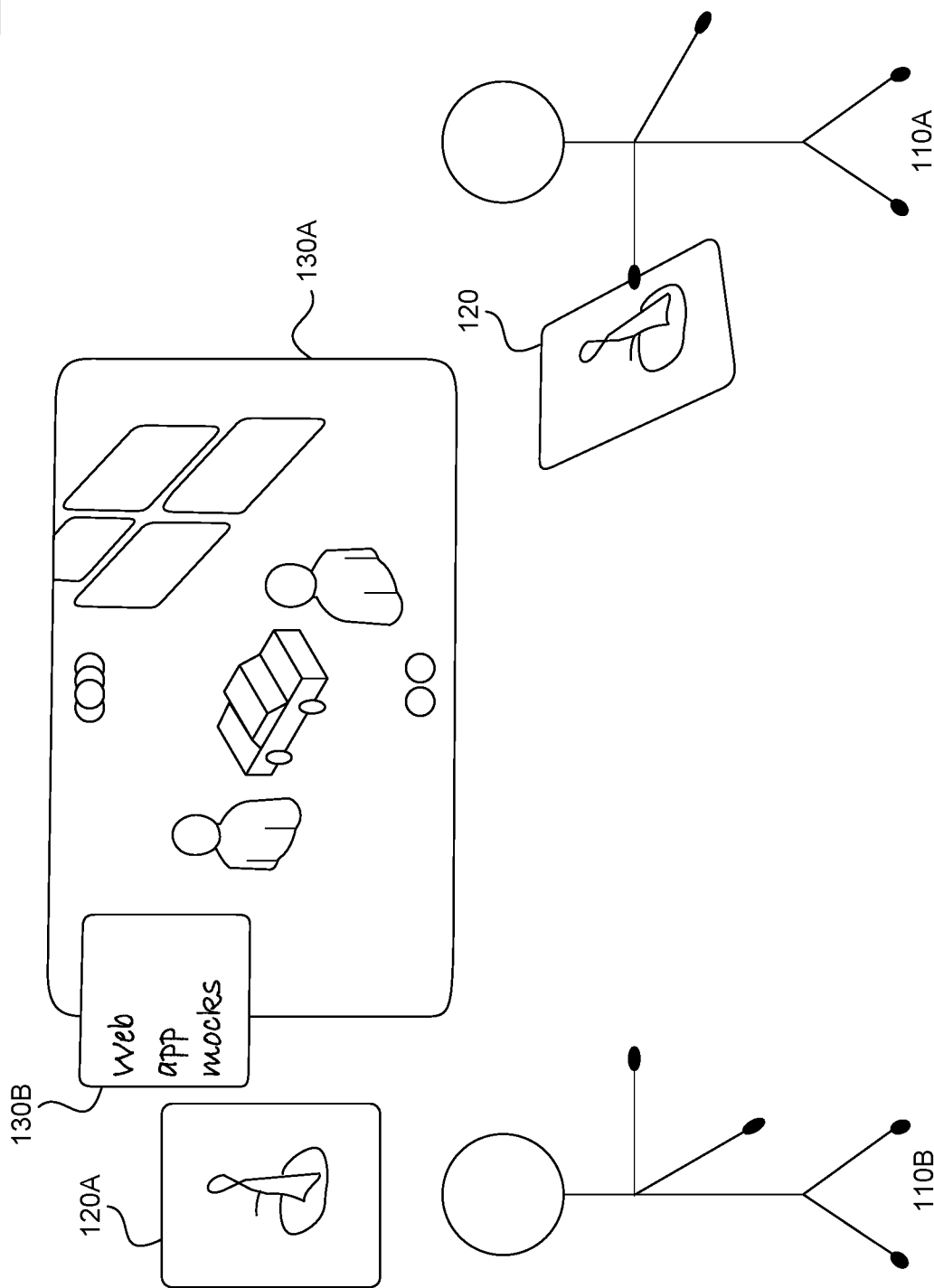
FIG. 1 is a block diagram illustrating functionality related to image editing and sharing in an augmented reality (AR) computing environment, according to some example embodiments.

FIG. 1 is a block diagram 100 illustrating functionality related to image editing and sharing in an augmented reality (AR) computing environment, according to some example embodiments.

An AR computing environment or AR system may be a type of holographic computing environment that enables users 110A, 110B to interact with digital objects 120, 120A, 130A, 103B (hereinafter generally referred to as "digital objects") in a simulated three dimensional computing environment. Examples of digital objects include, but are not limited to, images, videos, drawings, word processing or spreadsheet documents, visual representations of social sharing platforms, and various other types of computing or multimedia files. The users 110A, 110B (hereinafter generally referred to as "users 110" or "user 110") may grab, move, edit, view, or otherwise access and/or share the digital objects within the AR system. As used herein, AR computing environment, AR system, and virtual reality (VR) system may be used interchangeably.

In an embodiment, a user 110 may use a computing headset, computing glasses, or a mobile device (e.g., phone, tablet, or laptop) or other computing device to engage and interact or interface with the components and digital objects of an AR system, including other AR users.

In an embodiment, the headset may enable the AR system to display an interface in which the digital objects are visually displayed as appearing to be located within the physical environment where the user is located. For example, a digital object may appear to be sitting on a desk within the room, or hanging on a physical wall in the room. In an embodiment, the AR system may generate digital walls or canvas, such as 130A, on the various surfaces of the room.

In another embodiment, a user 110 may construct digital walls or surfaces 130A that do not necessarily correspond to physical planes or surfaces within the room in which the user 110 is located, but instead can be located anywhere within the AR meeting space. For example, a user 110 may physically be located in an open gymnasium and may construct a room of digital canvases around the user 110 within the user's reach which do not necessarily correspond to any physical walls of the gymnasium. These digital walls 130A may be moved or constructed anywhere the user 110 desires, including as ceiling or floor digital canvases.

In the example interface illustrated in FIG. 1, user 110A may be modifying a file 120, such as a painting, drawing, multimedia or image file. For example, user 110A may select or grab an image from the a digital wall 130A from the AR computing environment to edit, or open a file that is not yet displayed, or create a new file. User 110A may then draw, write, type text, annotate, otherwise edit or modify the file 120 within the AR environment. User 110A in the example illustrated may be drawing an image.

The AR system herein may provide for real-time updates and modifications to files to be made visible to all or a select number of users 110 in an AR environment. In an embodiment, user 110B may be able to see both the modifications being made by user 110A and the user 110A (or an avatar of the user) physically moving to make those modifications in real-time, within the AR environment.

For example, user 110A may open a new file or canvas and begin drawing on the canvas. Rather than waiting for user 110A to save a version of the file for it to be accessible to user 110B to examine, user 110B may see the file as user 110A is drawing it. Through their interface (of their laptop, mobile phone, AR goggles, etc.), user 110B may visually see user 110A is create a new file 120 and make various marks or type text or make other modifications to the canvas or document. So as user 110A is drawing, editing, modifying or otherwise updating image 120, the AR system will make the changes or modifications visible in real-time to user 110B and any other users of the AR system who happen to be present in the same meeting room of AR system.

In another embodiment, the changes to image or file 120 may vary in terms of visibility to different users 110B based on their permissions. While some non-modifying users (such as user 110B) of AR system may see the changes in real-time, other non-modifying users with lesser permissions may have to wait until user 110A saves changes, closes the image 120 file, or otherwise specifically grants those users access to see the image of file 120 and/or the changes that were made. In an embodiment, other users of the AR system may see user 110A making motions, but may not be able to see the file 120 that is being created in real-time, until user 110A grants them permissions.

In an embodiment, the image or file 120 being modified by user 110A may have been retrieved from and/or may be returned to a digital wall 130A. Digital wall 130A may be an AR generated wall or canvas that enables users 110 to share and interact with the same digital objects within the AR meeting space. Digital wall 130A may be a digitally rendered canvas which enable users to access, edit, see, add, move, or remove items or digital objects. As will be discussed in greater detail below, digital wall 130A may be an auto arranging wall.

As noted above, digital wall 130A may correspond to a physical wall within a room in which one or more of the users 110A, 110B are physically located. In another embodiment, users 110A, 110B may be physically or geographically separated while sharing a digital wall 130A within the same AR meeting room.

In an embodiment, the users 110 may be displayed in an AR interface as avatars. An avatar may include an image or rendering with physical aspects or characteristics of the user, such as facial features, body type, clothing, etc. that is used to represent the user 110. The avatars may include full body or partial body representations of the users 110A, 110B. As used herein, the terms avatars and users may be used interchangeably.

In an embodiment, each user 110 may be wearing their own AR enabled headset or another AR enabled device to access the AR meeting space illustrated in FIG. 1. Because the users 110A, 110B may not be physically co-located in the same room or physical space, the AR system may use a cloud computing system to store and make available data that is used by the AR headsets or other devices to render the AR environment and user interactions. For example, data from the cloud computing system may include the files or digital objects, digital walls or canvases, renderings or arrangement or dimensions of the room(s) where users 110A, 110B are located, shared meeting space information, and avatar information.

A cloud computing system may enable users share information in real-time or near-real time, including changes to a document. For example, if two users are accessing the same word processing document, and a first user changes the text, the second user may see the text as or after it is changed. However, the second user does not see is the physical movements of the first user as the first user is actually making the change, typing on a keyboard, drawing, etc. as the file itself is being updated or modified. The second user only sees the modifications after they are made by the first user.

In the AR environment of FIG. 1, the cloud computing system may enable users to view in real-time both the changes or edits to a digital object such as file 120, as well as the physical movements of another user or avatar as the user is making those changes. In an embodiment, if the other user 110A making the changes and is collocated in the same physical room as user 110B, then user 110B may be able to see the actual user making the motions that correspond to the changes (rather than an avatar). If, however, user 110B is located in a different physical environment than user 110A, then user 110B may see user 110A rendered as an avatar, and the avatar moves in accordance with the actual user's motions as the changes are being made.

As noted above, each user 110A, 110B may have their own headsets through which they see the AR meeting space. The headsets may provide each user 110A, 110B with their own unique perspective of the AR meeting space based on their location (or location of their avatar) within the room or AR meeting space. As such, if user 110B is standing on the other side of the room or AR meeting space from user 110A, it may be difficult for user 110B to see the changes that are being made to file 120 which is located in front of user 110A. As such, to make the changes more widely accessible to other users within the meeting space, the AR environment may render a duplicate copy 120A of the image or file 120 being edited by one user 110A. In an embodiment, the AR system may then render the changes being made by user 110A on simultaneously on both the file 120 in front of user 110A and the copy 120A that may be more widely viewable by other users. In an embodiment, copy 120A may be an enlarged version of file 120 so that it is more easily viewable.

In the example illustrated, copy 120A may be rendered on a shared wall or digital canvas 130A. As noted above, user 110A may select file 120, to edit, from a shared digital wall 130A. The file 120 may originally have been located on digital wall or canvas 130A in the position of copy 120A. As is discussed in greater detail below, AR system may generate a copy of the selected object for user 110A to edit (as file 120), and maintain a copy 120A of the digital object in the original position on the wall. Then, for example, the AR system may illustrate or render changes on both the file 120 and copy 120A simultaneously. In an embodiment, the copy 120A may be rendered with translucence or another visual indicator to communicate to other users the file is currently being edited by one of the users of the AR environment. In an embodiment, the copy 120A may include a blue or different color highlight which may also be rendered around user 110A so that other users can see quickly visually determine which user 110A is editing which digital object.

Figure 10:
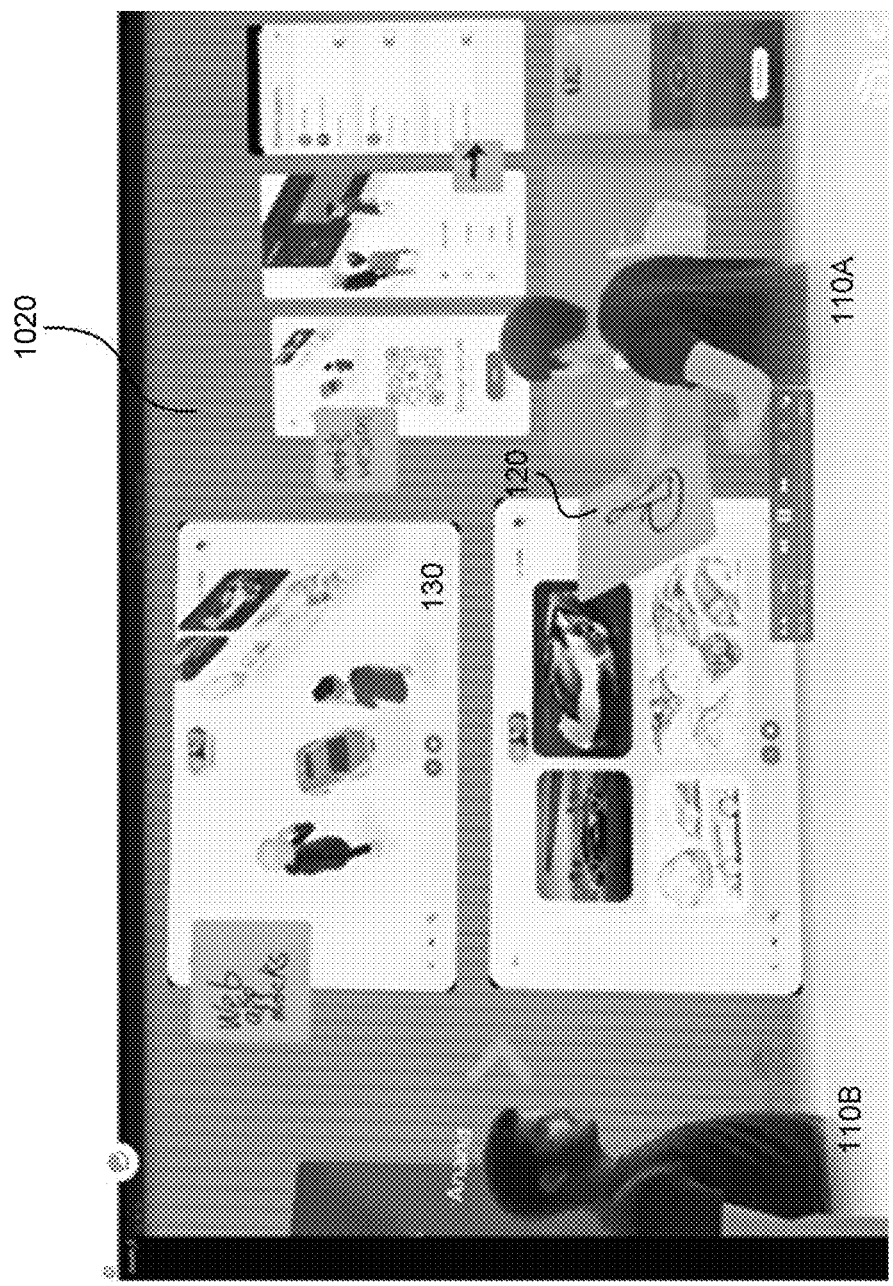
FIG. 10 is an example screenshot of an augmented reality (AR) computing environment, according to an example embodiment.

FIG. 10 is an example screenshot 1000 of an augmented reality (AR) computing environment, according to an example embodiment. The example screenshot 1000 illustrates example avatars of users 110A, 110B, the file 120 being edited by user 110A and various digital objects arranged on a larger digital canvas or digital wall 1020. The previous digital wall 130A from FIG. 1, may be rendered as one digital object 130 on a larger canvas 1020 with other digital objects as illustrated.

Figure 2B:
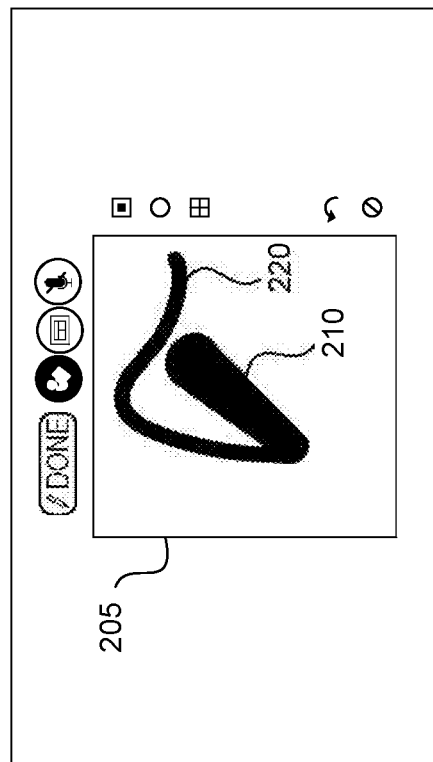
FIGS. 2A and 2B illustrate examples of how a user may draw or edit an image within an AR system, according to some embodiments.
Figure 2A:
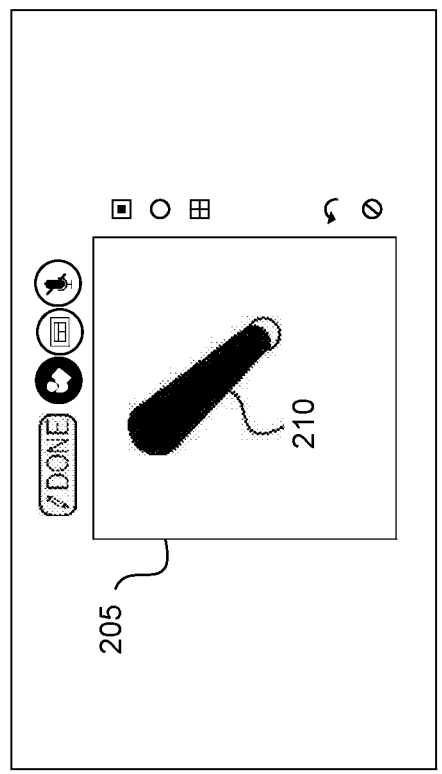

FIGS. 2A and 2B illustrate examples of how a user may draw or edit an image within an AR system, according to some embodiments.

In an embodiment, a user (e.g., user 110) may create a new image or annotation on a canvas 205. Canvas 205 may be a new image document, blank canvas, or may be an existing image or other file or digital object on which the user wants to use the drawing functionality in the AR system. In other embodiments, canvas 205 may be a video, word processing, or other type of multimedia file. The AR system may enable a user to draw, type, or use a speech-to-text system to draw or edit the canvas 205.

In an embodiment, user 110A (from FIG. 1) may physically use their finger to draw or edit images in the AR environment. However, from their own perspective (e.g., through an AR enabled headset user 110A may be wearing), their own finger may be rendered as a drawing tool 210 when the drawing functionality is activated.

In an embodiment, the AR system, through the headset, may detect what the user is doing with the user's hands (e.g., various gestures). For example, a camera in the headset may record or track the user's movements of their hands, and the AR system may covert the movements into corresponding gestures or commands or display components. The AR system may then perform the requesting command on one or more virtual objects.

Example hand gestures (as they may directed to one or more AR objects) may allow a user to grab, move, expand, contract, edit, or otherwise access various AR objects. For example, a grab motion (open and closing of a hand) may be detected by the AR system as a user's intent to grab (and move) a particular object in the AR environment.

As such when user 110A is editing file 120A, the user 110A may see a selected drawing tool 210 instead of their finger. Or, for example, a user 110A may make a gesture as if holding a pencil or pen, which may indicate to the AR system to render a pencil or pen or other drawing tool 210 in or as their hand or finger.

Similarly, another user 110B (through their own headset) may see user 110A holding a drawing tool 210, which may indicate to user 110B that user 110A is editing or drawing an image, even though in physical reality user 110A is only using their finger(s) to draw, make marks, or edit a file 120. In another embodiment, user 110A may see a rendering of their finger as drawing tool 210. So for example, their finger (as rendered through their headset) may make paint or other markings on canvas 205.

Drawing tool 210 may be illustrated as a pen, pencil, paintbrush, or other drawing or modification tool which moves in accordance with one or more designated fingers of a user. For example, user 110A may activate the drawing functionality in the AR system and use their index finger (which appears in their headset or interface of the AR system) as drawing tool 210 to draw an image. As the user moves their finger, the drawing tool 210 may move accordingly and make marks 220 on the canvas 205. The marks may include drawing lines or shapes, colors, shading, filling-in, or other edits.

In an embodiment, the drawing tool functionality may enable a user to switch between using a pen, paintbrush, or other drawing, erasing, or editing tools 210. In an embodiment, different user fingers could be assigned different drawing tools 210. So for example, on their right hand a user's index finger could be a pen, middle finger a pencil, and on their left hand their ring finger a paintbrush, and their thumb an eraser. The user may also adjust the thickness, density, and color or shading of these tools.

In an embodiment, a user may have the option to turn on and off their drawing tool 210. For example, when drawing tool 210 is turned on, the digital pen may make marks on the canvas 205. When the drawing tool 210 is off, the drawing tool image may be modified to indicate an off position and the user may move their hand without making marks on canvas 205. When the drawing tool 210 is off, the AR system may replace the pen image with a finger image, changing a color of the tool, indicating "off" on interface or some other visual and/or auditory signal indicating a state of the tool 210 as being on or off. In an embodiment, user may use voice commands to turn on, off, and/or modify drawing tool 210.

In an embodiment, multiple users 110A, 110B may be modifying the same canvas 205 simultaneously. Then for example, each user may see two drawing tools 210, one indicating their drawing tool 210 and one labeled or visually indicated (e.g., by color) as belonging to another user who is simultaneously accessing the same canvas 210 for editing. The AR system may also track which edits or modifications to image 120 were made by which user. For example, edits made from a first perspective may have their edits as being more opaque than the edits being made by another user. Or, the edits may be labeled as belonging to the other user.

In another embodiment, each user 110A, 110B may only see their own drawing tool 210, but may see markings 220 made by other users 110 who may be simultaneously accessing and modifying canvas 205.

Even though each user 110A, 110B may be making changes to their own local copy of a canvas 205, edits made by other users may become simultaneously (or near simultaneously) visible to each user as they are being made. The AR system may merge changes from both users 110A, 110B together into a final document. In an embodiment, the AR system may track which user made which drawings or changes. In an embodiment, each user 110A, 110B may be restricted to only rolling back their own changes to a canvas 205. In another embodiment, the users 110A, 110B can roll back any of the changes made by any user who happened to modify the canvas 205. Also, through the AR system, the users 110A, 110B may be in verbal communication while editing the same canvas 205.

Figure 3B:
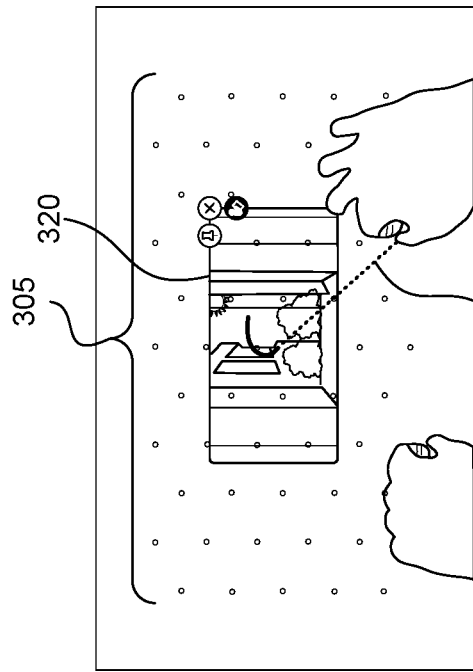
FIGS. 3A-3C illustrate how an AR system may enable users to edit digital objects, according to some example embodiments.
Figure 3C:
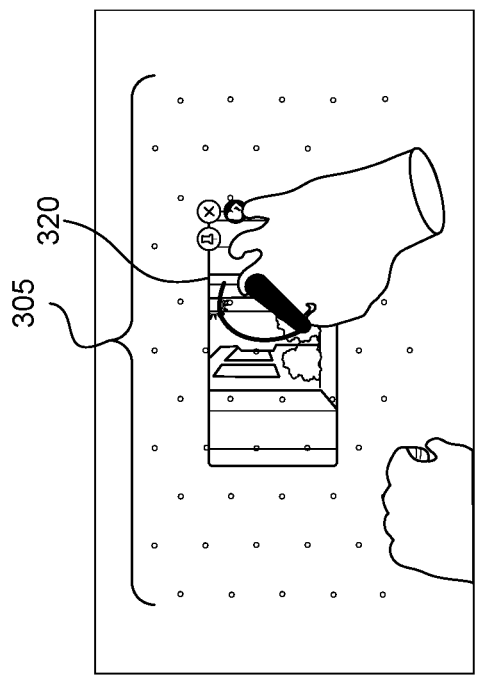
Figure 3A:
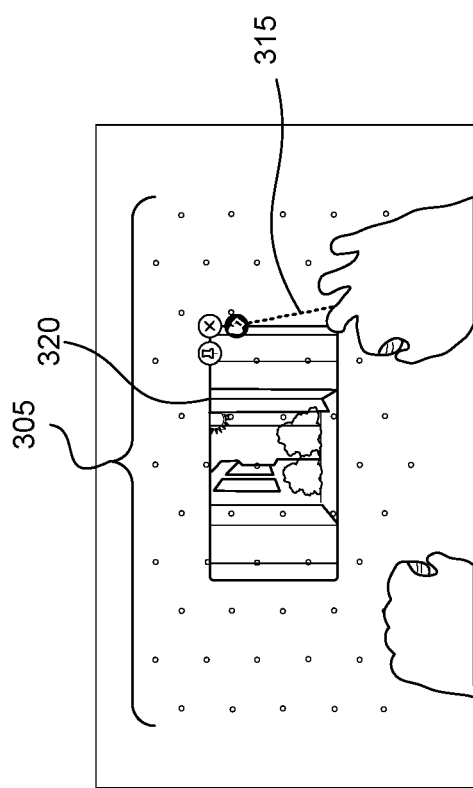

FIGS. 3A-3C illustrate how an AR system may enable users to edit digital objects, according to some example embodiments.

FIG. 3A illustrates how a user can use their fingers or hands to make a gesture to select a digital object 320, such as an image, from a digital wall or canvas 305 in an AR environment to access or edit. For example, the user can point to an object 320 on a wall that is located on the other side of the room within an AR meeting space. In an embodiment, from the user's perspective the selected image or digital object 320 may be highlighted, or a visual indicator 315 may show the user where their pointing is being interpreted as being directed.

The user can then make a gesture with their fingers, such as a pinch gesture to select the digital object 320. In an embodiment, the user can activate a drawing or edit command with regard to the selected digital object 320, with a gesture, menu selection, or voice command FIGS. 3B and 3C illustrate various embodiments of how the edit or draw command may be executed by the AR system.

FIG. 3B illustrates an embodiment in which the AR system allows the user to modify the image 320 from a distance. For example, the digital object 320 may remain in its original location in the AR meeting space on the digital wall or canvas 305 and the user may edit the image 320 using their hands from their location within the AR meeting space. The modifying user 110 may use similar drawing tools as discussed above with respect to FIGS. 2A-2B. However, rather than the AR system providing the modifying user (e.g., 110A) a copy of the selected digital object 320 that may consume greater interface or screen real estate, the AR system may allow the user to edit the digital object 320 as it remains in its original position within the AR environment.

To improve accuracy of a user editing a digital object 320 at a distance, the AR system may generate a pointer 330 or line indicating where on the digital object 320 the user's hands are focused. For example, the beam or pointer 330 may be solid, a dotted line, or include other visual characteristics. In an embodiment, the pointer 330 may only be visible to the editing user, while other users in the AR environment cannot see the pointer 330. In another embodiment, other users within the AR environment may be able to see the pointer 330 from the editing user to the selected digital object 320.

In an embodiment, the user's hands may be displayed as holding a being a drawing tool 210 while markings 220 are made on the digital object 320. In another embodiment, the user's hands may be rendered as being empty (e.g., an avatar with nothing in their hand), while the actual drawing tool 110 is rendered on or near the selected digital object 320 and is illustrated as marking the object 320. In another embodiment, the drawing tool 210 may be displayed both in the user's hand and on the digital object while markings 220 are being made. Other users in the AR environment may also see the one or more drawing tools 210 and/or the pointer 330 while a user is editing digital object 320 at a distance.

FIG. 3C illustrates an example, in which the selected digital object 320 may be moved from the digital wall 305 to come closer to the user. This may enable the user to edit the digital object more closely, similar what was described above with respect to FIGS. 2A-2B. As described above with respect to FIG. 1, if user selects digital object 120A, a copy of the digital object 120 may be seen by the editing and other users to float across the room to a position in front of the editing user 110A.

In an embodiment, with different gestures, a user 110 can toggle between drawing at a distance or drawing up close. For example, a pinch command may activate a drawing functionality with the selected object 320, and a come closer hand gesture may cause the object 320 to move closer so the user can draw up close, while a push back gesture may cause the object 320 to move away so the user can draw at a distance.

FIG. 4 is a flowchart 400 illustrating example operations for providing functionality related to image editing and sharing in an AR computing environment, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to the figures.

In 410, an edit command indicating a selection of an image from within an augmented reality computing environment is received from a user. For example, as illustrated in FIG. 3A, a user may select an image or digital object 320 from a digital canvas 305 within an AR computing environment or workspace.

In 420, the image is moved from a first location within the augmented reality computing environment to a second location within the augmented reality computing environment responsive to the edit command, wherein the second location is closer to the first user than the first location. For example, as illustrated in FIG. 3C, the selected digital object 320 may be moved from the digital canvas 305 to a location more directly in front of the editing user. This may also be illustrated in FIG. 1, in which digital object 120A may be selected and moved to a location in front of user 110A as digital object or file 120.

In 430, one or more edits to the image are received from the user. For example, as illustrated in FIG. 2B, a user may make different markings 220 on the digital object, image, or a canvas 205.

In 440, the image, including the one or more edits, is returned to the first location upon a completion of the one or more edits. For example, when the user in FIG. 3C is done editing the selected digital object 320, the digital object may return to its original location on the digital wall or canvas 305 as illustrated in FIG. 3A.

Augmented reality (AR) systems allow users to interact with digital objects in a three-dimensional fashion, as if the digital objects were physical objects in the room. In any AR workspace there can be any different number of digital objects in the workspace. However, trying to arrange these digital objects within the workspace can be a time consuming task for users which still may result in objects inadvertently overlapping or obstructing one another, and consuming additional processing resources as objects are constantly rearranged.

Figure 5A:
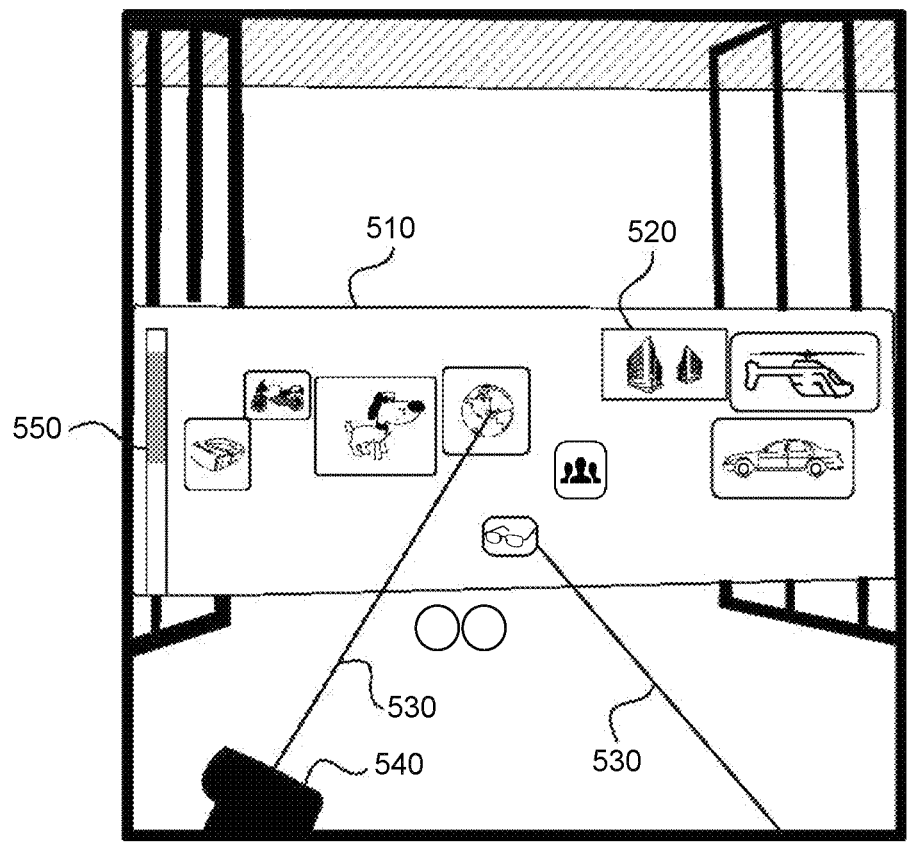
FIGS. 5A-5C illustrate example functionality of an auto-arranging wall in an AR computing environment, according to some embodiments.
Figure 5B:
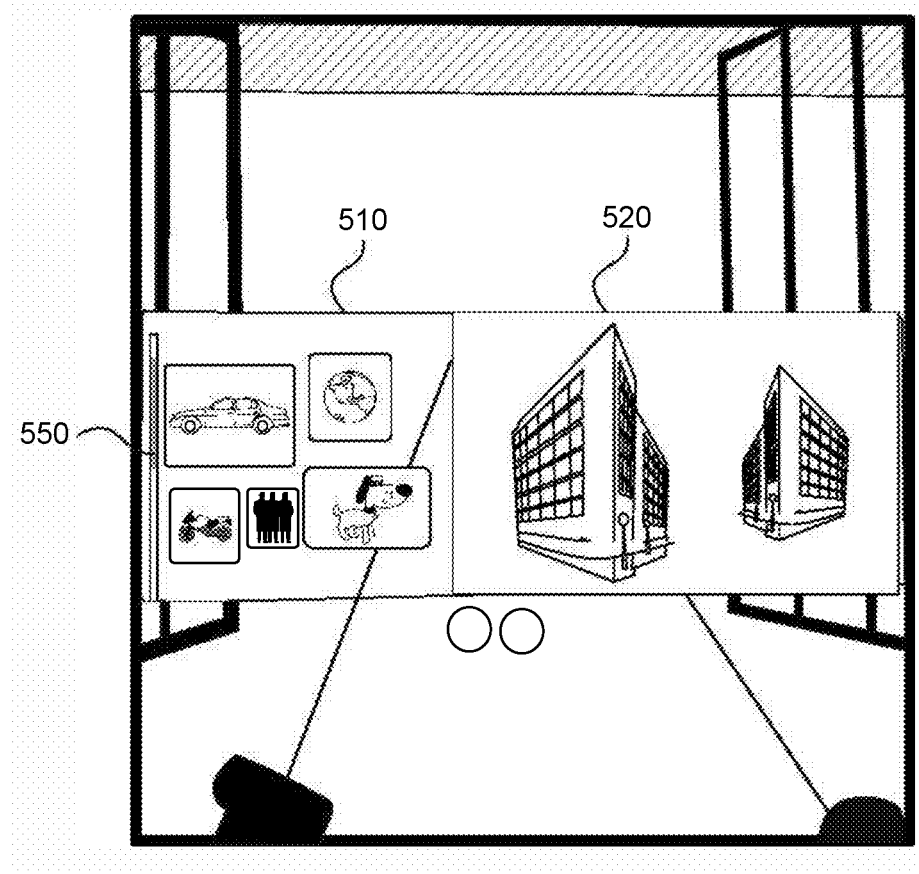
Figure 5C:
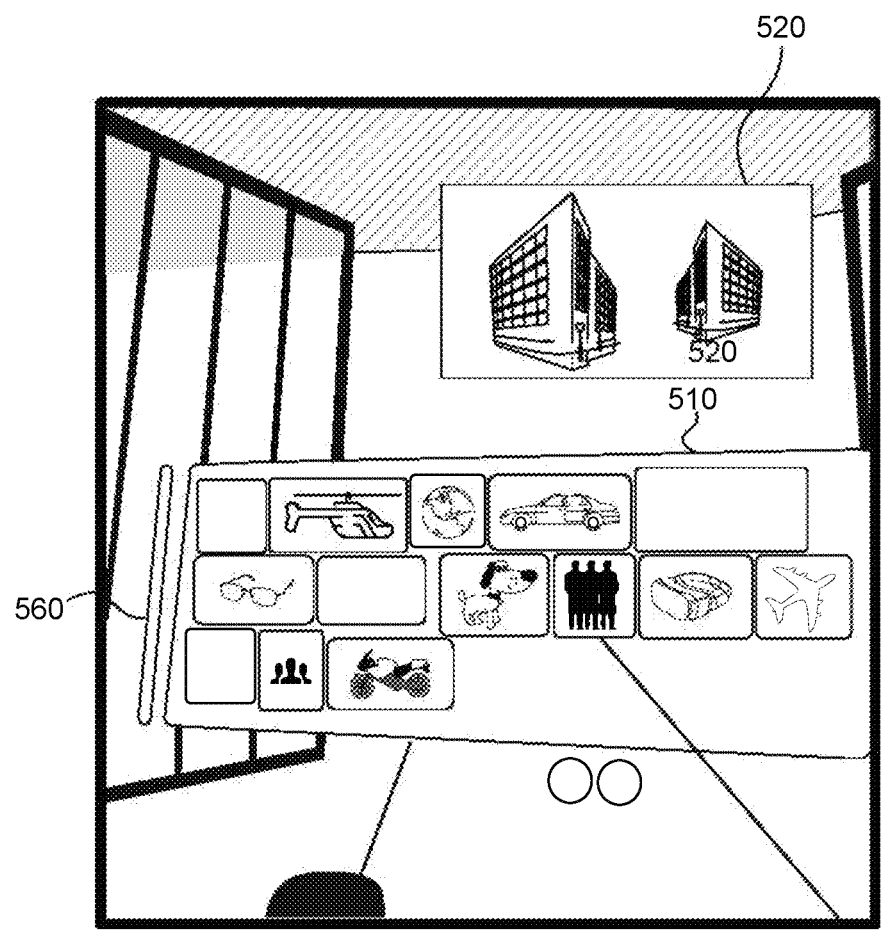

FIGS. 5A-5C illustrate example functionality of an auto-arranging wall in an AR computing environment, according to some embodiments.

Rather than requiring users (e.g., users 110) to manually place and position digital objects on a digital wall or canvas precisely where they want them to appear, an auto wall 510 may automatically arrange the digital objects placed on a digital wall or canvas. Auto wall 510 may visually arrange and rearrange the digital objects to avoid overlap or visual obstruction between the digital objects sharing a digital wall or canvas.

For example, a user may add the digital object 520 (e.g., the picture of the buildings) to auto wall 510, change its size, delete it, or move it to a different location in an AR meeting space. Rather than requiring a user to manually rearrange all the other digital objects (e.g., the image of the car, helicopter, dog, etc.) each time the user changes the size or location or digital object 520, auto wall 510 may automatically adjust the sizes and/or locations of other digital objects sharing the same digital wall or canvas. For example, if user removes object 520 from wall, rather than leaving a gap in the wall, auto wall 510 may rearrange the remaining digital objects on the wall to make better use of the available wall space and viewing area.

If user wants to place the digital object 520 back on the wall 510 after removing it, rather than requiring the user to find an open space on the wall or create an open space on wall by changing the sizes and positions of other digital objects, auto wall may allow the user to place the digital object 520 anywhere on the wall, and may automatically rearrange the other digital objects to avoid any visual obstruction that may otherwise take place.

Similarly, the user may move digital object 520 to different locations on the wall 510, and wall 510 may rearrange, resize, and move other digital objects from the wall 510 to enable the user to place the digital object 520 wherever the user wants on the wall 510, or another location in the AR meeting space.

Auto wall 510 may be a digital canvas within an AR computing environment or meeting space that is used to display, edit, share digital objects, such as images, documents, videos, or other files within an AR meeting space.

A user within the AR environment may interact with the auto wall in a variety of different ways. For example, the user may walk up to the wall within the AR meeting space and use their hands to make grabbing gestures to select various digital objects and then move, toss, edit, replace, or resize those digital objects either on the auto wall or anywhere else within the AR environment. The wall 510 may then rearrange the other digital objects from the wall responsive to whatever the user is doing with the selected digital object 520.

Or, for example, as illustrated in FIG. 5A, the AR system 500A may provide the user the capability to rearrange, resize, add/remove digital objects from the digital wall from a distance. In an embodiment, the AR system may render pointers 530 (which may be similar to the pointers 315, 330 described above with respect to FIGS. 3A and 3B) to enable a user to more easily add, select, edit, resize, reshape, remove, or move the digital objects on the auto wall 510. In an embodiment, when the pointers 530 are activated within the AR system, the user's hands may appear as a laser pointer 540 within the AR environment. This use of pointers 530 may simplify the user's interactions with various digital objects in the AR meeting space.

The AR system may be configured to sort and size as many images, documents, or other digital objects across one or more auto arranging walls or auto walls 510 in an AR meeting space.

In an embodiment, an auto wall 510 may include a scrollbar 550 that allows for scroll or infinite scroll. Scrollbar 550 may enable a user to see all the digital objects on the wall, and may include vertical and/or horizontal scroll. Infinite scroll may cause the AR system to repeat digital objects on the wall that that a user may scroll in any direction, infinitely. In an embodiment, the infinite scroll may include a visual indicator or break that indicates the images are beginning to repeat themselves.

As illustrated, the laser pointers 530 may enable a user to point, select, move and rearrange images or digital objects on the auto wall 510. Editing the auto wall 510 may include scrolling, adding digital objects, removing digital objects, or changing the size of the wall. In an embodiment, auto wall 510 may include sort functionality that allows the user to sort the digital objects by date created, time added to the wall, file type, file size, file name, etc.

As illustrated in FIG. 5B, the user may have selected and resized digital object 520. The resized digital object 520, which was made larger (relative to digital object 520 of FIG. 5A), may cause the auto wall 510 to rearrange, resize, and/or move or remove images from the auto wall. The selected digital object 520 may be assigned a highest priority, such that all other images or digital objects may be assigned a lower priority.

The other (non-selected) digital objects on the auto wall 510 may have their own relative priorities which may be configured by a user. Example priority features may correspond to the characteristics of information described above with respect to sorting the objects. For example, priorities may be assigned based on: date created, time added to the wall, file type, file size, file name, etc. The lowest priority objects may be resized and made smaller first, or otherwise removed from the wall 510, and placed onto either another auto wall 510 or into a not-currently visible scroll area of the wall 510. In an embodiment, higher priority digital objects may be assigned increased sizes and/or more central locations on the auto wall 510.

In an embodiment, the priorities and sizes of the other images on the auto wall, their visibilities, may be individually assigned and adjusted by a user. For example, a user may designate certain images as "always visible" such that no matter in which direction a user scrolls, the image remains visible on the wall. If a user increases a size of another image, then any other always visible images may restrict how large the user can increase the size of the image, because the other images may always remain visible.

In an embodiment, a user may assign priority to digital objects from particular programs or applications, that were opened or modified by particular users, by a last access or open date, or by any other priority. The more highly prioritized images may be given preferential size and/or visibility placement when the digital objects are being arranged with respect to a user resizing a digital object on wall.

The user may also indicate a maximum size, minimum size, or no size change for various digital objects. The max size may indicate a maximum size to which an image may be increased in size, the minimum size may indicate a smallest size to which an image may be decreased. In an embodiment, a user may use zoom to zoom and/or out of a particular image on the auto wall without changing its size. The no size change may restrict a user from changing the size and/or location of the image or digital object on the wall.

In an embodiment, the size and/or location and/or visibility of higher priority images may be prioritized over those of lesser priority digital objects. So for example, in increasing the size of digital object 520 from a smaller size to a larger size, the lower priority digital objects may be resized (shrunk) and/or moved off the screen (into a scroll section of wall where they are no longer immediate visible) prior to higher priority digital objects. If there is no more lesser priority digital objects to resize or move off the visible portion of wall into the scroll section, then the AR system may begin modifying the remaining higher priority images in accordance with any user preferences or restrictions placed on the objects.

In an embodiment, the user may be prohibited from increasing the size of a selected digital object 520 beyond the established boundaries of the auto wall 510. In another embodiment, the user may be provided the option of increasing the size of the auto wall 510 to fit the increased sized digital object 520 if it expands beyond the original wall size or boundaries.

FIG. 5C illustrates an example of a user removing, unpinning, or detaching the selected digital object 520 from the auto wall 510. When the digital object 520 is removed from the auto wall 510 because the user either deleted or unpinned and placed the digital object 520 elsewhere in the AR meeting space, the space formerly occupied by digital object 520 on auto wall 510 may be filled in with the highest priority digital objects described above.

In an embodiment, the priority of which digital objects are used to fill in the space formerly occupied by digital object 520 may assigned based in part on their proximity to the location of digital object 520 on wall 510. So those digital objects that were proximally located closest to digital object 520 when it was on the wall 510 may be the digital objects that are moved into the space when digital object 520 is removed from auto wall 510. Then any remaining or new space created on wall 510 may be filled in, at least in part, with other digital objects based on their priority indicators.

Using priorities as a basis, the AR system may first restore highest priority digital objects to their original, previous, or default size. If there is still visible space remaining, then that space may be filled by making lower priority digital objects visible. In an embodiment, the AR system may minimize the size of the lowest priority digital objects, and make as many of them visible at a time as possible.

560 illustrates another auto wall 510 that can be scrolled to. In an embodiment, because an interface or room may include a limited amount of visible area, or for organizational purposes, a user may arrange objects across multiple auto walls 510, 560. As illustrated, the AR interface may provide an indication whether another auto wall 560 is available to be scrolled to or opened.

In an embodiment, a user can tear off and move auto walls 510. For example, a user may more auto wall 510 to a different AR meeting space, or move the entire wall to a different location within the AR meeting space. For example, a user may move wall 510 to the ceiling of the room and make wall 560 and its digital objects visible where wall 510 used to be.

Figure 6:
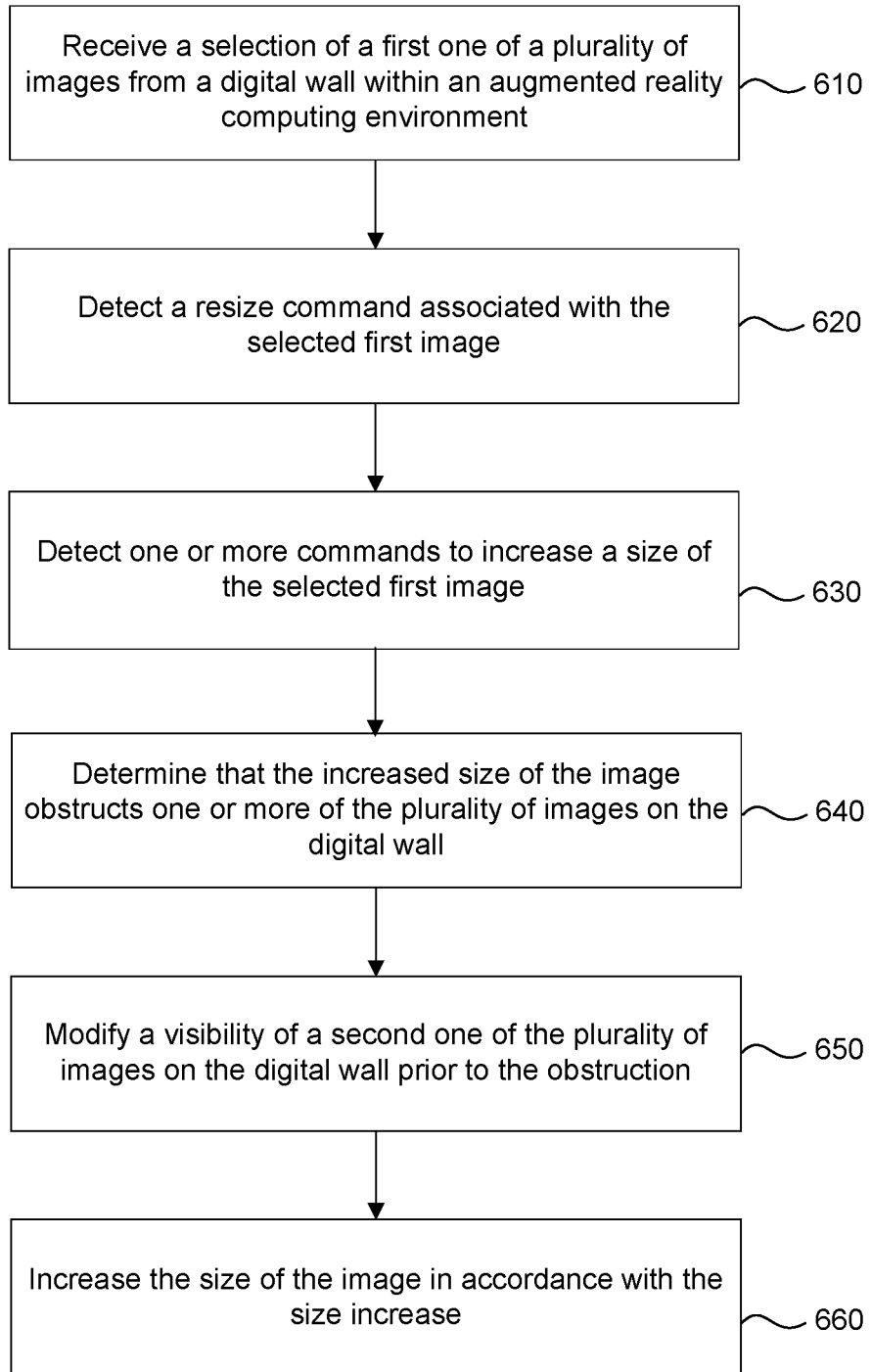
FIG. 6 is a flowchart illustrating example operations for providing an auto-arranging wall in an AR computing environment, according to some embodiments.

FIG. 6 is a flowchart 600 illustrating example operations for providing an auto-arranging wall in an AR computing environment, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to the figures.

In 610, a selection of a first one of a plurality of images from a digital wall within an augmented reality computing environment is received. For example, in FIG. 5A, a user may use pointers 530 to select digital object 520.

In 620, a resize command associated with the selected first image is detected. For example, as illustrated in FIG. 5B, the user may indicate a command to resize the image or digital object 520. In an embodiment, the user may make a hand gesture that indicates a resize command or may speak "resize", "increase size", or "decrease size" which activates a resize command on the selected digital object 520.

In 630, one or more commands to increase a size of the selected first image is detected. For example, as illustrated in FIG. 5B, the user may have resized the digital object 520. In an embodiment, the user may begin with their hands closer together and gesture or move their hands farther apart to increase the size of the digital object 520. Or, for example, the user may speak the words "increase length" "increase width" or "increase diagonal" to cause the AR system to incrementally increase, or decrease (if the word "decrease" is spoken), the size of a selected digital object 520.

In 640, it is determined that the increased size of the image obstructs one or more of the plurality of images on the digital wall. For example, in FIG. 5B, because the new increased size of the digital object 520 would obstruct the digital objects that previously occupied that area, wall 510 may move and/or resize the digital objects to avoid any such visual obstruction.

In 650, a visibility of a second one of the plurality of images on the digital wall is modified prior to the obstruction. For example, as illustrated in FIG. 5B, the digital objects may have been resized and/or moved based on the increased size of digital object 520, thus avoiding any visual obstruction. In an embodiment, one or more objects may have been moved to a scroll area of digital wall that is not presently visible or to a new or different auto wall 510.

Figure 7:
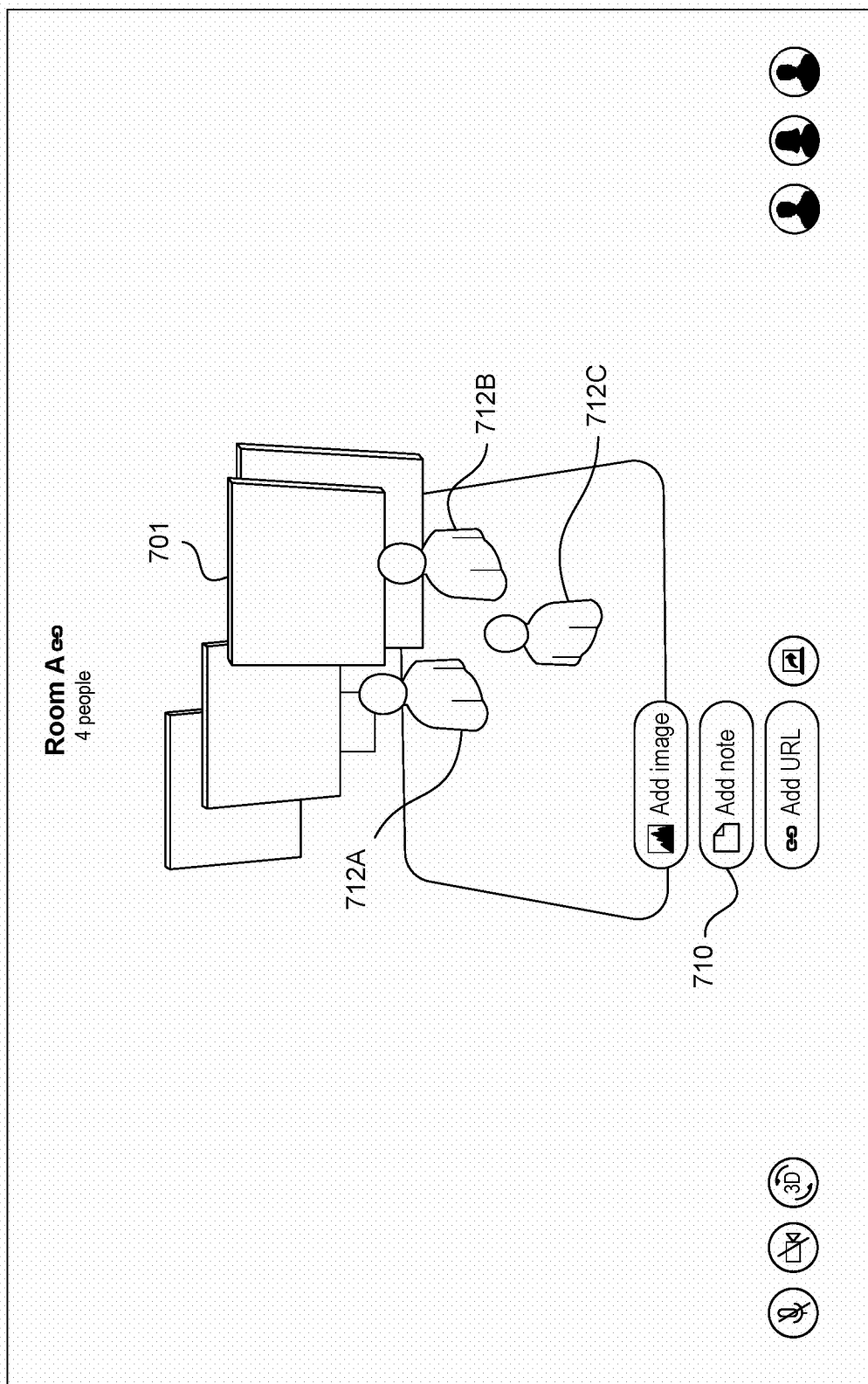
FIG. 7 is example screen display of a spectator view of an augmented reality (AR) computing environment, according to some embodiments.

In 660, the size of the image is increased in accordance with the size increase. For example, as illustrated in FIG. 5B, the digital object 520 is rendered to whatever size the user desires. As illustrated in FIG. 5C, if the user moves the digital object 520 off the wall 510, the auto wall 510 may fill in that space with other digital objects FIG. 7 is example screen display of a spectator view of an augmented reality (AR) computing environment, according to some embodiments. The screen display provided in FIG. 7 is merely exemplary, and one skilled in the relevant art(s) will appreciate that many approaches may be taken to provide a suitable screen display in accordance with this disclosure.

Content menu 710, an example contextual menu, may allow a user to upload content from their mobile device, laptop computer, or other computing device into the AR meeting space. Content menu 710 may be accessed by a user engaging drop-content button 705. For example, a user may add an image or photograph from their device, copy a link into the AR meeting space, or add a sticky note as a digital object into the AR meeting space. In another embodiment, the content menu 710 may be expanded from and/or collapsed into a menu icon as described herein.

Avatars 712A-C may be representations of users active in an AR meeting space. Avatars 712 may uniquely identify and distinguish a user in the system from other users, allowing the viewing user to easily determine the identity of the user in the AR meeting space, on the AR meeting space launcher, or elsewhere in the AR system. Room A indicates four people are in the room, while only 3 avatars 712A-C are illustrated. In an embodiment, the fourth user may not see their full avatar and may account for the fourth person. However, the fourth person may see their hands when interacting with digital objects within the AR space.

Numerous approaches may be taken to create an avatar in the AR meeting space. In one embodiment, a user may create an avatar manually that represents their digital selves. In another embodiment, a user may upload an image and the image may be displayed as the user in the AR meeting spaces. In another embodiment, a video feed may be captured, e.g., by a webcam or camera on a mobile device, and the video feed placed in the AR meeting space to represent the user. In another embodiment, a mobile device may use a real-time face capture, e.g., using infrared, and AR/VR cloud system may assemble this into a digital representation in the AR meeting space that moves with the users facial expressions.

Figure 8:
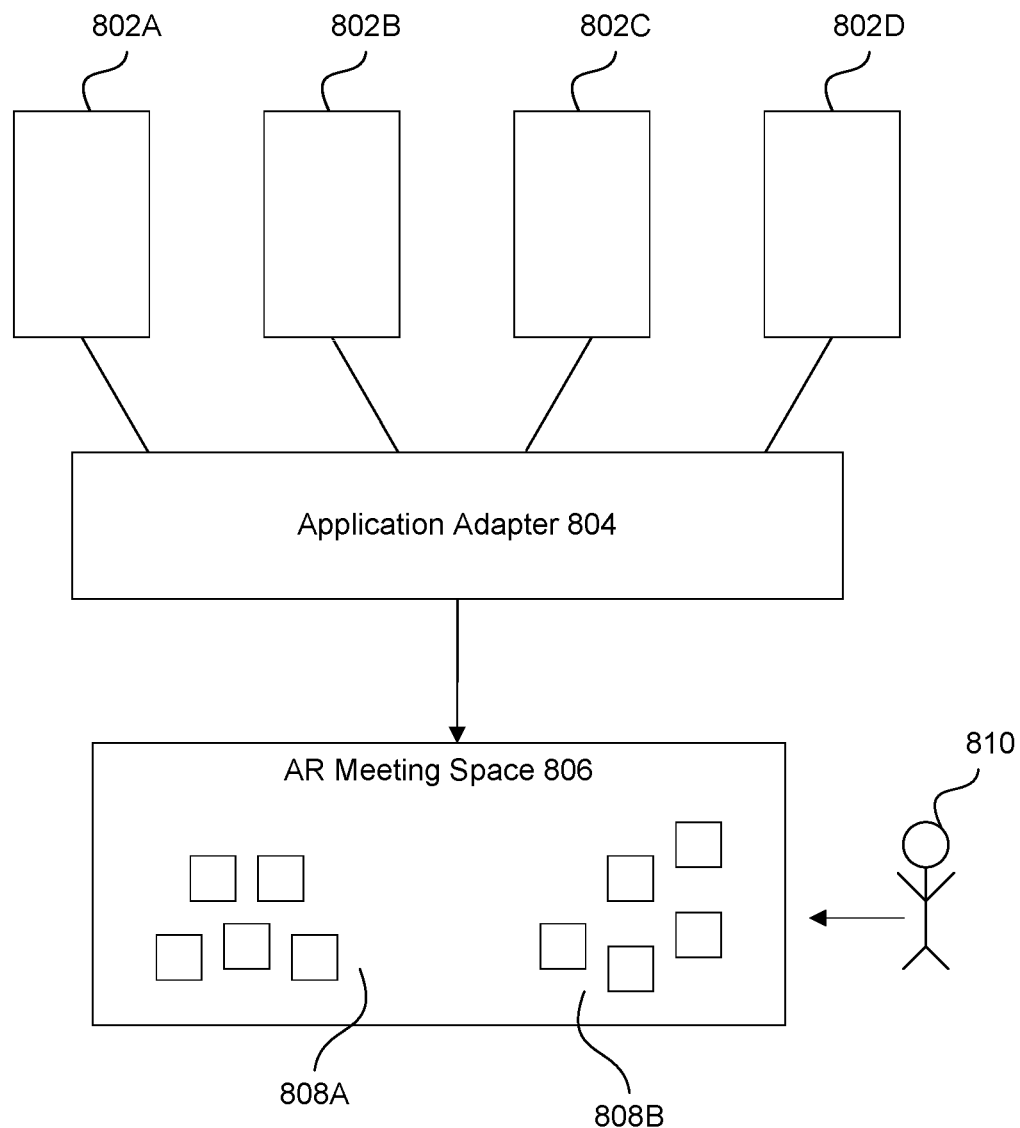
FIG. 8 is a block diagram of AR environment, according to some embodiments.

FIG. 8 is a block diagram of AR environment 800, according to some embodiments. Any operation herein may be performed by any type of structure in the diagram, such as a module or dedicated device, in hardware, software, or any combination thereof. Any block in the block diagram of FIG. 8 may be regarded as a module, apparatus, dedicated device, general-purpose processor, engine, state machine, application, functional element, or related technology capable of and configured to perform its corresponding operation(s) described herein. AR environment 800 may include media sources 802, application adapter 804, AR meeting space 806, three-dimensional representation 808, and user 810.

Media sources 802 may include social media, news feeds, web sites, email feeds, search results, and many other media types that are capable of providing structured data to AR/VR (virtual reality) cloud system for representation in an AR meeting space in three dimensions. Examples of social media may include feeds from FACEBOOK, INSTAGRAM, TWITTER, etc. Examples of web sites include news sites, such as THE WASHINGTON POST or THE NEW YORK TIMES, or any other web site available via the world wide web or other hypertext transfer protocol. Media sources may provide an RSS feed that may be accessed by AR/VR cloud system to pull/retrieve information from the media source. Such an RSS feed may be filtered to include information relevant to a particular user or subset of users within the AR system. An email feed may be accessed through a suitable email protocol, e.g., SMTP, POP3, etc.

Application adapter 804 may transform structured data, include models, received from the media source into a three-dimensional representation. Application adapter 804 may identify a source of the media and deploy a customized, enhanced adapter if the source is known and such an enhanced adapter exists. Application adapter 804 may employ a default adapter where the source and/or type is not known. A default adapter may provide baseline interaction techniques by representing the structured data in a simplistic fashion.

To transform the data, application adapter 804 may identify content provided by the media source while dividing the content into appropriate sections or groups. For example, in an RSS feed, application adapter 804 may divide information "<item>" tags into separate sections. For another example, for a web page, application adapter 804 may break down a particular web page into sections based on <iframe> tags, <section> tags, etc. Application adapter 804 may extract from the structured data images, videos, sound files, etc. to be associated/displayed with the determined content and/or sections.

By grouping the received data into sections that may be manipulated, application adapter 804 may select an appropriate three-dimensional interaction model to apply to the three-dimensional representation. For example, if the media source is a news feed, a three-dimensional representation may be displayed that is tailored to allow users to interact with news feed. In another example, if the media source is a WIKIPEDIA page, then an appropriate three-dimensional representation may be provided that is specific to WIKIPEDIA entries. The breadth and scope of functionality that is available to users when viewing the three-dimensional representation may vary according to the type of media source being viewed. Advanced techniques to sort, group, search, organize, view, etc. data may be available in three dimensions that are not available in two dimensions.

Application adapter 804 may be further enhanced to apply particularized expectations about a specific media source to derive additional information to include in the three-dimensional representation. For example, a particularized adapter may be deployed to parse a NEW YORK TIMES news feed that differs from a particularized adapter deployed to a comparable WASHINGTON POST news feed. Such an enhanced application adapter may gather additional information from the structured data provided by the media source and render incorporate that information into the three-dimensional representation.

AR meeting space 806 is an augmented reality meeting space, as described in detail above. Application adapter 804 may provide a three-dimensional representation to AR/VR cloud system 206 to recreate in AR Meeting Space 806.

3D representations 808, such as 3D representation 808A and 808B may be displayed in AR meeting space 806 to represent the structured data received from media sources 802 and transformed by application adapter 804. Various media sources are described throughout this disclosure specifically with respect to their representation in AR meeting spaces in three dimensions, e.g., as 3D representations 808.

These three-dimensional representations are merely exemplary, but provide suitable examples of three-dimensional representations of social media feeds, web pages, and search results. Additional three-dimensional representations may be developed to display other media sources, such as email feeds, tasklists, and any other suitable structured data that may be received from an external source and represented in three dimensions in an AR meeting space.

User 810 may view three-dimensional representations 808 in AR meeting space 806 using an AR headset, or in other embodiments, a mobile device or laptop computer.

Figure 9:
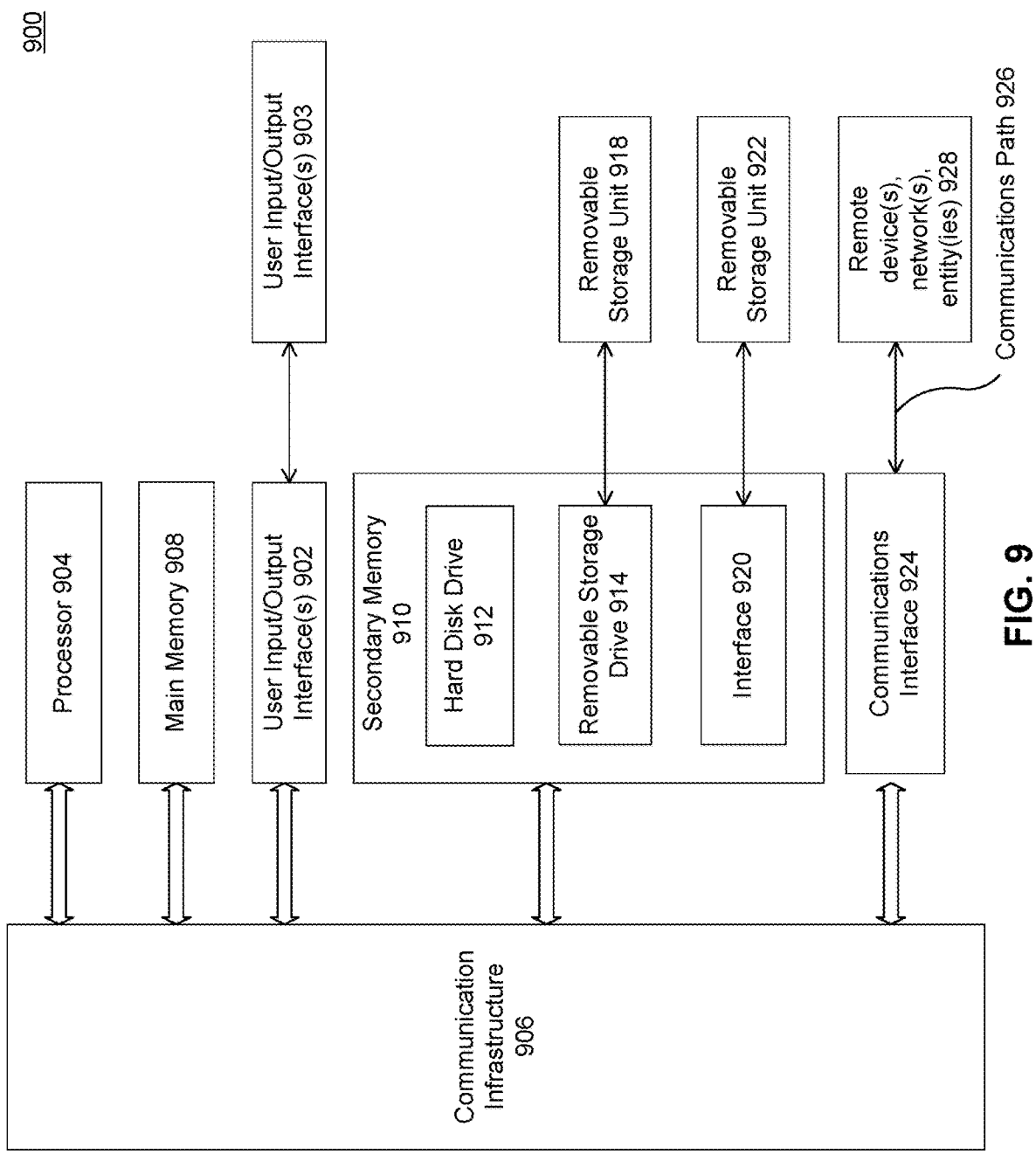
FIG. 9 is an example computer system useful for implementing various embodiments.

FIG. 9 is an example computer system useful for implementing various embodiments.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:
1. A computer-implemented method comprising:
receiving, from a first user, an edit command indicating a selection of an image from within an augmented reality computing environment;
responsive to the edit command, moving the image from a first location within the augmented reality computing environment to a second location within the augmented reality computing environment, wherein the second location is closer to the first user than the first location, and wherein the image is displayed on an interface of a second user simultaneously in both the first location and the second location within the augmented reality computing environment;
providing, after moving the image to the second location closer to the first user, an editing tool for editing the image, wherein the editing tool is moved responsive to a finger movement of a first finger of the first user, and wherein the editing tool is displayed in lieu of the first finger of the first user;

receiving, from the first user, one or more edits to the image using the editing tool; and returning the image, including the one or more edits, to the first location upon completion of the one or more edits.

2. The method of claim 1, wherein the one more edits are displayed, in real-time, on the interface of the second user of the augmented reality computing environment, as the one or more edits are received from the first user.

3. The method of claim 2, wherein the image is displayed on the interface of the second user in the first location within the augmented reality computing environment.

4. The method of claim 3, wherein an indication is displayed on the image in the first location that the image is being edited by the first user.

5. The method of claim 2, wherein the image is displayed on the interface of the second user in the second location within the augmented reality computing environment.

6. The method of claim 2, further comprising:
receiving from the second user one or more edits to the image, wherein interfaces for both the first user and the second user both display the one or more edits received from the first user and the one or more edits received from the second user.

7. The method of claim 6, further comprising:
receiving a request from the second user to edit the image prior to the returning;
generating a copy of the image; and
displaying the copy of the image in a third location on the augmented reality computing environment in closer proximity to the second user than the first location, wherein the one or more edits to the image received from the second user are received on the copy of the image.

8. The method of claim 1, wherein the image displayed in the second location is closer to the first user than the image displayed in the first location.

9. The method of claim 1, further comprising:
detecting at least one of a come closer gesture or a push back gesture from the first user, wherein the come closer gesture causes the image to move closer to the first user during the editing, and wherein the push back gesture causes the image to move away from the first user during the editing; and
moving the image in accordance with the detected gesture during the editing.

10. A system, comprising:
a memory; and
at least one processor coupled to the memory and configured to perform operations comprising:
receiving, from a first user, an edit command indicating a selection of an image from within an augmented reality computing environment;
responsive to the edit command, moving the image from a first location within the augmented reality computing environment to a second location within the augmented reality computing environment, wherein the second location is closer to the first user than the first location, and wherein the image is displayed on an interface of a second user simultaneously in both the first location and the second location within the augmented reality computing environment;

providing, after moving the image to the second location closer to the first user, an editing tool for editing the image, wherein the editing tool is moved responsive to a finger movement of a first finger of the first user, and wherein the editing tool is displayed in lieu of the first finger of the first user;

receiving, from the first user, one or more edits to the image using the editing tool; and returning the image, including the one or more edits, to the first location upon completion of the one or more edits.

11. The system of claim 10, wherein the one more edits are displayed, in real-time, on the interface of the second user of the augmented reality computing environment, as the one or more edits are received from the first user.

12. The system of claim 11, wherein the image is displayed on the interface of the second user in the first location within the augmented reality computing environment.

13. The system of claim 12, wherein an indication is displayed on the image in the first location that the image is being edited by the first user.

14. The system of claim 11, wherein the image is displayed on the interface of the second user in the second location within the augmented reality computing environment.

15. The system of claim 11, further comprising:
receiving from the second user one or more edits to the image, wherein interfaces for both the first user and the second user both display the one or more edits received from the first user and the one or more edits received from the second user.

16. The system of claim 15, further comprising:
receiving a request from the second user to edit the image prior to the returning;
generating a copy of the image; and
displaying the copy of the image in a third location on the augmented reality computing environment in closer proximity to the second user than the first location, wherein the one or more edits to the image received from the second user are received on the copy of the image.

17. A non-transitory computer-readable device having instructions stored thereon that, when executed by at least one computing device, cause the at least one computing device to perform operations comprising:
receiving, from a first user, an edit command indicating a selection of an image from within an augmented reality computing environment;
responsive to the edit command, moving the image from a first location within the augmented reality computing environment to a second location within the augmented reality computing environment, wherein the second location is closer to the first user than the first location, and wherein the image is displayed on an interface of a second user simultaneously in both the first location and the second location within the augmented reality computing environment;
providing, after moving the image to the second location closer to the first user, an editing tool for editing the image, wherein the editing tool is moved responsive to a finger movement of a first finger of the first user, and wherein the editing tool is displayed in lieu of the first finger of the first user;

receiving, from the first user, one or more edits to the image using the editing tool; and returning the image, including the one or more edits, to the first location upon completion of the one or more edits.

18. The non-transitory computer-readable device of claim 17, wherein the one more edits are displayed, in real-time, on the interface of the second user of the augmented reality computing environment, as the one or more edits are received from the first user.

19. The non-transitory computer-readable device of claim 18, wherein an indication is displayed on the image in the first location that the image is being edited by the first user.

* * * * *